No. 794,151.

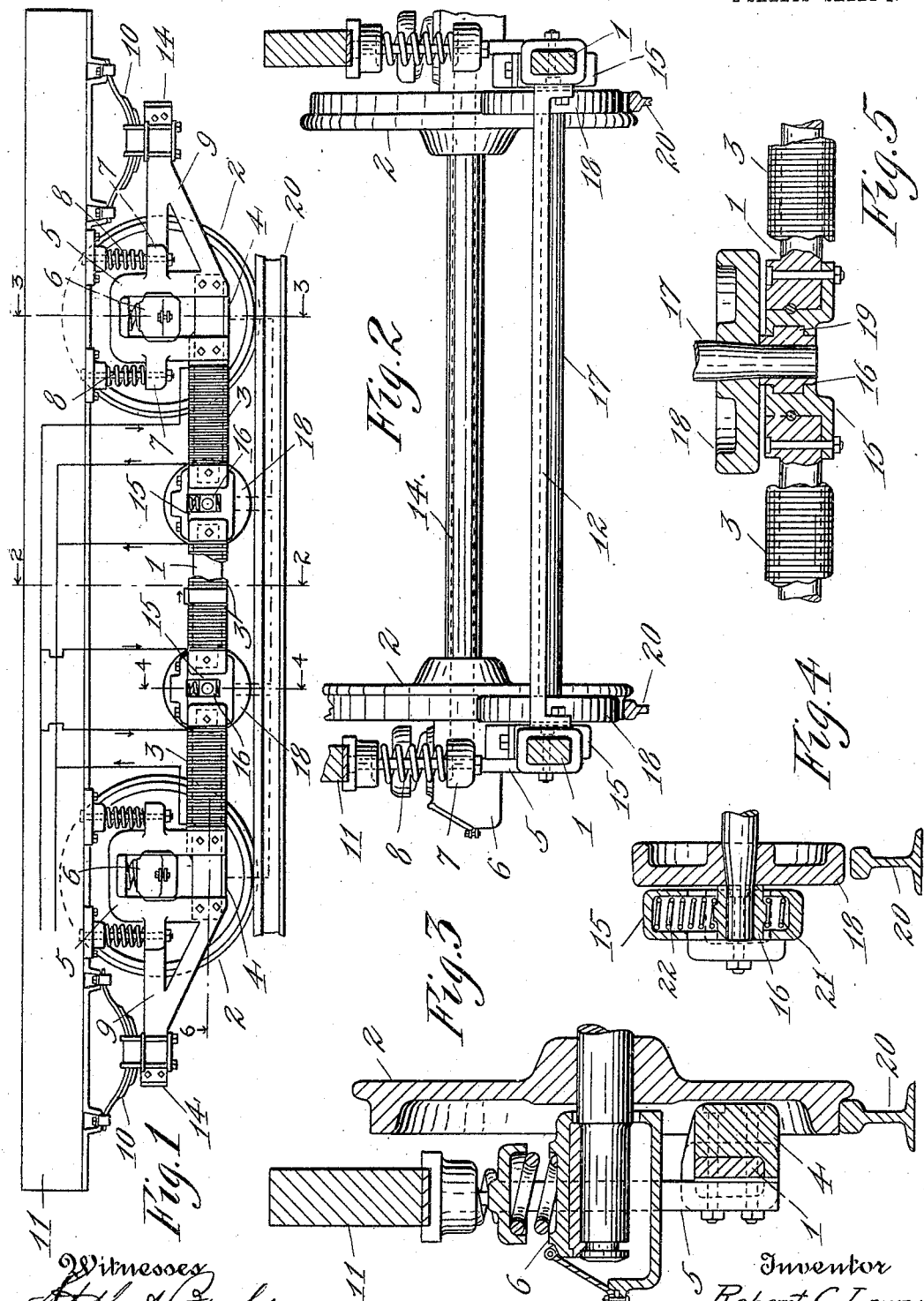

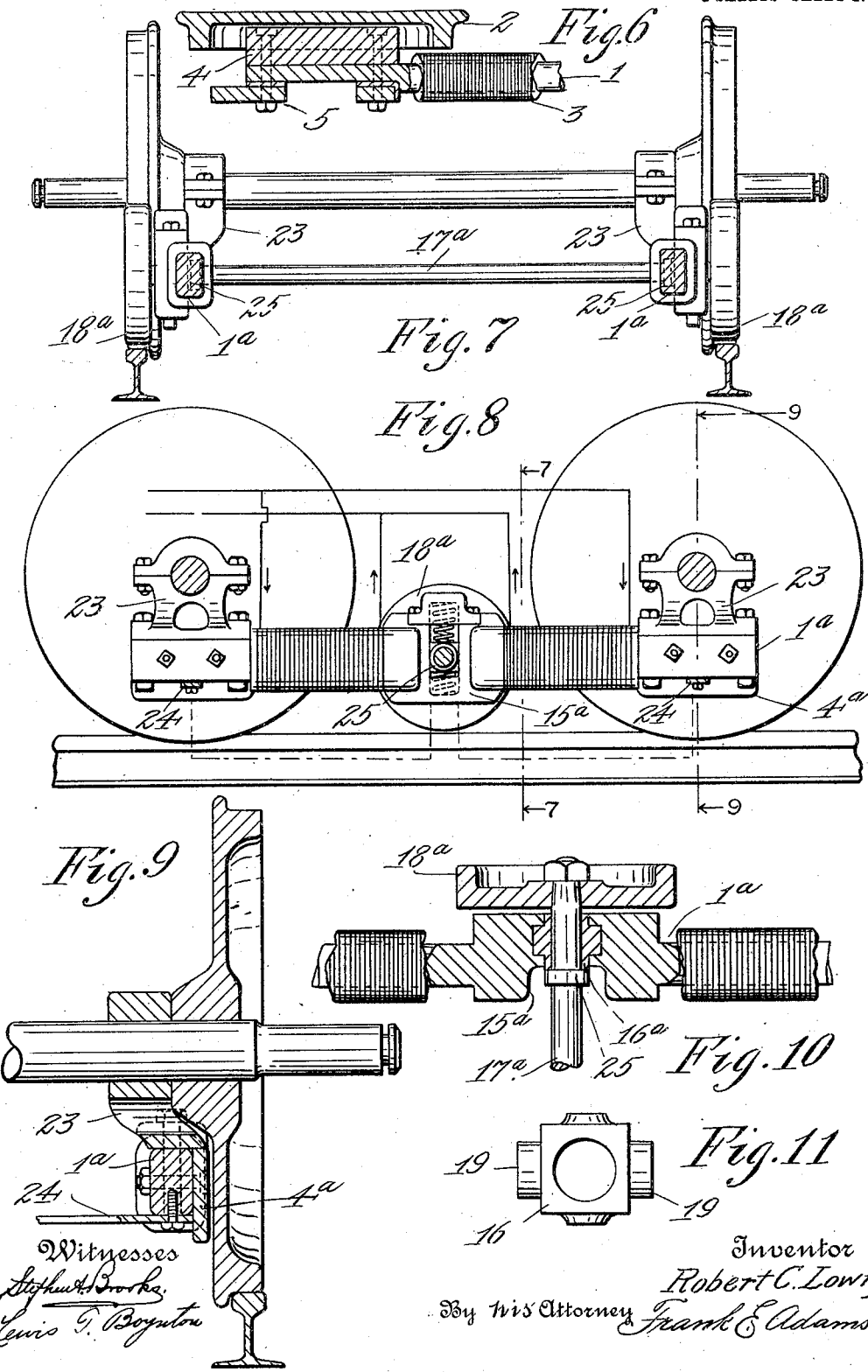

Patented July 4, 1905.

UNITED STATES PATENT OFFICE.

ROBERT CHARLES LOWRY, OF SEATTLE, WASHINGTON.

DEVICE FOR INCREASING THE ADHESION BETWEEN WHEELS AND RAILS.

SPECIFICATION forming part of Letters Patent No. 794,151, dated July 4, 1905.

Application filed November 17, 1904. Serial No. 233,203.

*To all whom it may concern:*

Be it known that I, ROBERT CHARLES LOWRY, a subject of the King of England, and a resident of the city of Seattle, in the county of King and State of Washington, have invented certain new and useful Improvements in Devices for Increasing the Adhesion Between Wheels and Rails, of which the following is a specification.

My invention relates to improvements in devices for increasing the adhesion between the supporting-wheels of a truck and the rails upon which they roll, and comprises the novel parts and combinations of parts hereinafter described, and particularly pointed out in the appended claims.

The object of my invention is to simplify and improve devices of this character.

In the drawings I have shown and will hereinafter describe my invention embodied in forms which are now preferred by me.

With reference to the accompanying drawings, Figure 1 is a side elevation of a truck having my invention applied thereto at the outer sides of the wheels. Fig. 2 is a cross-sectional elevation taken on line 2 2 of Fig. 1. Fig. 3 is a vertical section of one of the wheels of the truck and adjacent parts on line 3 3 of Fig. 1. Fig. 4 is a sectional elevation of one of the auxiliary wheels, taken on line 4 4 of Fig. 1. Fig. 5 is a horizontal section taken through the parts shown in Fig. 4. Fig. 6 is a fragmentary section taken on line 6 of Fig. 1. Fig. 7 is a transverse sectional elevation of a modified construction, taken on line 7 7 of Fig. 8. Fig. 8 is a side elevation of two supporting-wheels of a truck, taken from the inner sides and shows my invention applied in the modified construction of Fig. 7. Fig. 9 is a transverse section taken on line 9 9 of Fig. 8. Fig. 10 is a fragmentary horizontal section taken through one of the auxiliary wheels and adjacent parts as embodied in the modification, and Fig. 11 is an elevation in detail of the journal-box for the axle of the auxiliary wheel.

Similar reference characters indicate similar parts in the respective figures.

In carrying out my invention in the form shown in Figs. 1 and 2 I have utilized bars forming a part of the truck-frame as cores, upon each of which are arranged consecutively a series of electromagnet-coils, and the supporting-wheels of the truck are used in connection with certain poles of the electromagnets thus formed and auxiliary wheels in connection with other poles of these magnets to produce an attractive tendency between the truck and rails, thereby increasing the adhesion of the supporting-wheels to the rails. Reference character 1 indicates the bars or cores, which are arranged at opposite sides of the truck as near to the rails as they may conveniently be placed and extend between and along the outer sides of successive supporting-wheels 2, running upon the same rail. These bars or cores and their attendent parts are identical in construction and application. Consequently a description of one will be sufficient for a clear understanding of both. Upon the bar or core 1, which is of magnetizable metal, are placed in succession a series of coils or helices 3, of properly-insulated electric wire, said coils or helices being so disposed as to be capable of producing in said bar a magnetic pole opposite each supporting-wheel 2 and poles intermediate the said wheels when the coils are energized. The poles adjacent the supporting-wheels 2, which are of magnetizable metal, are provided with pole-pieces, such as 4, (shown in Figs. 3 and 6,) lying closely adjacent but not touching the said wheels, so that only a narrow air-gap is left between the pole-piece and wheel, thus reducing the reluctance to the passage of the magnetic flux as much as possible, while avoiding the friction which would follow from actual contact. These pole-pieces may be integral parts of the bar or core, or they may consist of pieces detachable therefrom, as shown in Figs. 3 and 6. In either event it is desirable that each pole-piece be suitably formed to present to the side surface of the wheel a surface or face of large area relatively to the cross-sectional area of the bar or core, the said face conforming to but not touching the opposing wheel-surface. The bar or core 1 is secured to hangers 5, which are preferably of non-magnetizable metal and are supported on the journal-boxes 6. These hangers are formed with brackets 7 for the reception of springs 8 and an extension-bracket 9 for the reception of spring 10, by which springs the car-body frame 11 is supported. The bars or cores 1 at opposite sides of the truck may be rigidly held apart by the use of a strut 12, (shown in Fig. 2,) preferably of non-magnetizable metal, and struts 14 are secured to the extension-brackets on opposite hangers 5.

In the form of my device shown in Figs. 1 and 5 the bar or core 1 is composed of sections which are rigidly connected at the points where intermediate poles are formed with pole-pieces in the form of blocks 15 of magnetizable metal. These blocks are suitably formed to receive and guide journal-boxes 16, which are preferably of bronze or gun metal. Journaled in the journal-boxes 16 are transverse axles 17, carrying auxiliary wheels 18, of magnetizable metal, which are close to but do not touch the pole-pieces or blocks 15, being separated and held therefrom by abutment against the journal-boxes, thereby affording narrow air-gaps between the pole-pieces and the auxiliary wheels for the same purpose as described in the case of the air-gaps between the supporting-wheels 2 and the pole-pieces 4. The journal-boxes 16 are movable vertically in transverse openings in the pole-pieces or blocks 15 and have side lugs or trunnions 19, which are engaged in vertical side grooves in the blocks, so that while movement of the boxes transversely of the truck is prevented they are still permitted to tilt with the axle as either end thereof is raised or lowered. The auxiliary wheels 18 are directly over the rails 20 and are normally close to but out of contact therewith, being supported by means of springs 21, and they may move upwardly upon striking any unusual elevation, being under moderate pressure by the springs 22.

The modified construction shown in Figs. 7, 8, and 9 is the same in principle as that described. In this case, however, there are but two electromagnet-coils on the bar or core $1^a$, which is placed at the inner sides of the supporting-wheels and provided at its ends with pole-pieces $4^a$, the bar or core being carried by suspension members 23, of non-magnetizable metal, journaled directly upon the axles of said wheels. These suspension members are given a bearing against surfaces upon the inner sides of the supporting-wheels, and the bars or cores at opposite sides of the truck are connected by ties 24, preferably of non-magnetizable metal. Only one set of the auxiliary wheels $18^a$ is shown in this construction, and I have shown the intermediate pole-piece or block $15^a$ as formed integral with the bar or core $1^a$. (See Fig. 10.) The auxiliary wheels $18^a$ are mounted in substantially the same manner as the wheels 18, previously described, excepting that they are carried on the ends of their axle $17^a$ and are placed at the outer sides of the bars or cores $1^a$. The axle $17^a$ is provided with opposite collars 25, which abut the inner ends of the journal-boxes $16^a$ and prevent the axle moving transversely of the truck.

In the form shown in Fig. 1 the magnet-coils between the auxiliary wheels 18 and the supporting-wheels 2 and the coils between the auxiliary wheels themselves are wound, or the electric current traverses the wire of which they are formed in opposite directions, so that successive pole-pieces on the core or bar 1 are of unlike signs—that is, of opposite polarity. When the coils are energized, the auxiliary wheels become magnetized and are thereby attracted toward and brought into contact with the rail. There are thus three magnetic circuits, each one of which pertains to one of the electromagnets. One of these circuits has both auxiliary wheels in its path, and the other two have each a supporting-wheel and one of the auxiliary wheels in circuit, the length of rail immediately below each electromagnet forming a part of the circuit to which the electromagnet pertains. The downward pull or pressure of the auxiliary wheels is brought through the springs 21 on the bar or core 1 and thence on the supporting-wheels 2 through the hangers 5 and axles of said wheels. The adhesion of the supporting-wheels is at the same time magnetically increased. The resulting large increase of adhesion that may be thus induced between supporting-wheels and rails may be utilized in driving the car or, with the assistance of brakes, in stopping it.

In Fig. 8 the electromagnet-coils between the supporting-wheels and the auxiliary wheels are wound, or the electric current traverses the wire of which they are formed in opposite directions, so that the pole-piece adjacent to the auxiliary wheel is of unlike sign or polarity to the pole-pieces adjacent to the supporting-wheels. In this case when the coils are energized the auxiliary wheel is attracted to the rail, bringing a downward pull or pressure on the bar or core $1^a$ and thence on the supporting-wheels through the suspension members 23 and the axles of said wheels. Two magnetic circuits are formed, both of which pass through the auxiliary wheel. The electromagnet-coils on the bars or cores at opposite sides of the truck are electrically connected with a suitable electric generator, and they are so wound or they are connected in such a manner with said generator that the pole-pieces lying at directly opposite points are of like magnetic polarity when said coils are energized.

In the arrangement shown in Fig. 1 it will be observed that the coils are wound on a bar or core, which constitutes a part of the side frame of the truck. By this expedient the bar or core is, in addition, a part of the truck structure, and the essential weight of the device is diminished thereby.

The supporting-wheels and the auxiliary wheels, as shown in the drawings, have straight centers or webs; but these may be of any desired shape, the adjacent faces of the pole-pieces being shaped correspondingly to effect clearance at all times.

It is evident that my invention may be embodied in other forms than those herein shown. I do not, therefore, desire to be understood as limiting myself to the exact constructions shown and described.

Having thus described my invention, what I claim as new, and desire to secure by Letters Patent of the United States of America, is—

1. In a device for increasing the adhesion between supporting-wheels and a track on which they travel, in combination with the wheels and a rail, electromagnets rigidly connected together and having poles adjacent the wheels and intermediate poles, and means to transfer magnetic flux between said last-named poles and the rail when said electromagnets are energized.

2. In a device for increasing the adhesion between supporting-wheels and a rail, in combination, the supporting-wheels, a magnetizable bar, electromagnet-coils arranged consecutively on said bar and adapted to produce therein poles adjacent said supporting-wheels and poles of a common polarity between consecutive coils, and means to transfer magnetic flux between the said last-named poles and the rail when said coils are energized.

3. In a device for increasing the adhesion between supporting-wheels and a track on which they travel, in combination with the wheels and a rail, a magnetizable bar, electromagnet-coils arranged consecutively on said bar and adapted to produce therein poles adjacent said supporting-wheels and intermediate poles, and rotatable means supported from said bar to transfer magnetic flux between said intermediate poles and the rail when said coils are energized.

4. In a device for increasing the adhesion between supporting-wheels and a track on which they travel, in combination with the wheels and a rail, a magnetizable bar, electromagnet-coils arranged consecutively on said bar and adapted to produce therein poles adjacent said supporting-wheels and intermediate poles, and rotatable means yieldingly supported from said bar to transfer magnetic flux between said intermediate poles and the rail when said coils are energized.

5. In a device for increasing the adhesion between supporting-wheels and a track on which they travel, in combination with the wheels and a rail, a magnetizable bar, electromagnet-coils arranged consecutively on said bar and adapted to produce therein poles adjacent said supporting-wheels and intermediate poles, and rotatable means yielding supported from said bar to transfer magnetic flux between said intermediate poles and the rail when said coils are energized, said means being normally out of contact with the rail.

6. In a device for increasing adhesion between supporting-wheels and a track on which they travel, in combination with the wheels and a rail, a magnetizable bar, electromagnet-coils arranged consecutively on said bar, and adapted to produce therein poles adjacent said supporting-wheels and intermediate poles, a vertically-movable wheel supported from said bar to transfer magnetic flux between said intermediate poles and the rail when said coils are energized, and means for yielding holding said wheel normally at a point intermediate the limits of its vertical movement.

7. In a device for increasing the adhesion between supporting-wheels and the rail, in combination, the supporting-wheels, a magnetizable bar extending alongside of and between consecutive wheels, a plurality of electromagnet-coils disposed successively on said bar and being adapted when energized to produce therein outer and intermediate poles, the outer poles lying opposite the consecutive wheels, and means whereby magnetic flux will be transferred between said intermediate poles and the rail when said coils are energized.

8. In combination with a truck, the supporting-wheels thereof and a rail, a magnetizable bar forming a part of the truck-frame, a series of electromagnet-coils arranged consecutively on the bar and adapted to produce therein poles adjacent the supporting-wheels, and intermediate poles, and means for transferring magnetic flux between said last-named poles and said rail when said coils are energized.

9. In combination with the rails and the supporting-wheels mounted thereon, opposite magnetizable bars extending alongside of the wheels, electromagnet-coils arranged consecutively on said bars and adapted to produce therein outer and intermediate poles, the outer poles lying adjacent the wheels, auxiliary wheels arranged opposite the intermediate poles for transferring magnetic flux between said last-named poles and the rails when said coils are energized, an axle connecting the auxiliary wheels, and means whereby said axle is supported for vertical movement of said auxiliary wheels independently of each other.

10. In combination with the rails and the supporting-wheels mounted thereon, opposite magnetizable bars extending alongside of the wheels, electromagnet-coils arranged consecutively on said bars, pole-pieces at the ends of said coils, the intermediate pole-pieces being formed with openings having their side walls grooved, journal-boxes slidably mounted in the openings of said pole-pieces and having trunnions mounted in the grooves thereof, resilient means disposed above and below said boxes, an axle having the end portions journaled in said boxes, and wheels mounted on said axle, substantially as and for the purpose specified.

11. In combination with the supporting-wheels and the rail, a magnetizable bar, electromagnet-coils arranged consecutively on the bar and adapted to produce poles therein the outer of which lie opposite said wheels, means connected to the bar adjacent the intermediate poles and being attracted toward the rail when said coils are energized, and means whereby the downward pull thus exerted on the bar is transferred to said supporting-wheels.

12. In combination with the supporting-wheels, the axles thereof, and the rails, a magnetizable bar, electromagnet-coils arranged consecutively on the bar and adapted to produce poles therein, the outer of which lie opposite said wheels, means connected to the bar adjacent the intermediate poles and being attracted toward the rail when said coils are energized, and means for suspending said bar from said axles.

13. In combination with the supporting-wheels, the axles thereof, and the rails, a magnetizable bar, electromagnet-coils arranged consecutively on the bar and adapted to produce poles therein, the outer of which lie opposite said wheels, a rotatably-mounted wheel supported from said bar adjacent the intermediate poles and being attracted toward the rail when said coils are energized, and means for suspending said bar from said axles.

14. In a device for increasing the adhesion between supporting-wheels and a rail, in combination with a truck, the supporting-wheels thereof, and a rail on which the wheels travel, a magnetizable bar forming a part of the truck-frame, a series of electromagnet-coils arranged consecutively on said bar, the electromagnets thus formed having pole-pieces arranged adjacent to but not touching the supporting-wheels, and intermediate pole-pieces, auxiliary wheels supported from said bar closely adjacent to but not touching the intermediate pole-pieces, and means for yieldingly supporting said auxiliary wheels close to but normally not in contact with the rail.

15. In a device for increasing the adhesion between supporting-wheels and a rail, in combination with a truck, successive supporting-wheels thereof, and a rail on which the wheels travel, a magnetizable bar extending alongside of said wheels and provided with pole-pieces lying between the axles of said wheels and the rail but not touching the wheels, and intermediate pole-pieces, means to support said bar from the axles of said wheel, electromagnet-coils arranged on said bar between said pole-pieces and adapted when energized to render consecutive pole-pieces of opposite polarity, auxiliary wheels supported from the bar closely adjacent but not touching the intermediate pole-pieces, and means for yieldingly supporting said auxiliary wheels close to but normally not in contact with the rail.

Signed at Seattle, Washington, this 9th day of November, 1904.

ROBERT CHARLES LOWRY.

Witnesses:
JOHN P. HAUSMAN,
A. J. ARMSTRONG.